United States Patent
Fahrenbach

(10) Patent No.: US 8,776,682 B2
(45) Date of Patent: Jul. 15, 2014

(54) DIRECT DRIVE FOR A PRESS

(75) Inventor: Jürgen Fahrenbach, Aichelberg (DE)

(73) Assignee: Schuler Pressen GmbH & Co. KG, Göppingen (DE)

( * ) Notice: Subject to any disclaimer, the term of this patent is extended or adjusted under 35 U.S.C. 154(b) by 476 days.

(21) Appl. No.: 12/928,373

(22) Filed: Dec. 11, 2010

(65) Prior Publication Data

US 2011/0083568 A1   Apr. 14, 2011

Related U.S. Application Data

(63) Continuation-in-part of application No. PCT/EP2009/054624, filed on Apr. 17, 2009.

(30) Foreign Application Priority Data

Jun. 18, 2008 (DE) .......................... 10 2008 028 652

(51) Int. Cl.
*B30B 1/42* (2006.01)

(52) U.S. Cl.
USPC ............. 100/282; 100/292; 72/430; 72/452.5

(58) Field of Classification Search
USPC ........... 100/35, 214, 273, 280, 281, 282, 283, 100/286, 292, 293; 310/81, 82; 72/443, 72/449, 450, 452.5, 430
See application file for complete search history.

(56) References Cited

U.S. PATENT DOCUMENTS

| | | | |
|---|---|---|---|
| 1,551,347 A * | 8/1925 | Trombetta | 318/161 |
| 3,785,282 A * | 1/1974 | Kamelander | 100/257 |
| 4,184,384 A * | 1/1980 | Levine | 74/579 E |
| 4,749,898 A | 6/1988 | Suzuki et al. | |
| 5,666,879 A * | 9/1997 | Kutscher et al. | 101/3.1 |
| 6,418,972 B2 * | 7/2002 | Krumm et al. | 139/188 R |
| 6,460,577 B1 * | 10/2002 | Krumm | 139/57 |
| 6,708,609 B1 * | 3/2004 | Korner et al. | 100/283 |
| 6,860,198 B2 * | 3/2005 | Fahrenbach | 100/193 |
| 6,913,044 B2 * | 7/2005 | Zwehl et al. | 139/1 E |
| 7,102,316 B2 * | 9/2006 | Beyer et al. | 318/625 |
| 7,445,439 B2 * | 11/2008 | Wohlrab | 425/107 |
| 7,629,713 B2 * | 12/2009 | Beaulieu | 310/323.01 |
| 2006/0055269 A1 | 3/2006 | Naito et al. | |
| 2008/0079320 A1 * | 4/2008 | Beaulieu | 310/15 |
| 2009/0064838 A1 | 3/2009 | Naito et al. | |
| 2009/0064839 A1 | 3/2009 | Naito et al. | |
| 2010/0320856 A1 * | 12/2010 | Lauke et al. | 310/80 |
| 2011/0290125 A1 * | 12/2011 | Ito et al. | 100/214 |
| 2012/0180675 A1 * | 7/2012 | Graf | 100/282 |
| 2012/0266766 A1 * | 10/2012 | Graf | 100/282 |
| 2012/0272843 A1 * | 11/2012 | Graff | 100/193 |

FOREIGN PATENT DOCUMENTS

| | | | | |
|---|---|---|---|---|
| DE | 4315463 C1 * | 5/1994 | | H02K 35/00 |
| DE | 41 09 796 C2 | 5/2002 | | |
| DE | 10 2004 009 256 B4 | 4/2008 | | |

* cited by examiner

*Primary Examiner* — Shelley Self
*Assistant Examiner* — Leonel Vasquez
(74) *Attorney, Agent, or Firm* — R. S. Lombard; K. Bach

(57) ABSTRACT

The invention relates to a press having a direct electric drive, without any motion transmitting apparatus, such as, for example, gears or gear drives wherein the electric direct drive is located between an eccentric 3 and a connecting rod 6 and brings about a relative movement between the eccentric 3 and the connecting rod 6.

12 Claims, 3 Drawing Sheets

DIRECT DRIVE FOR A PRESS

CROSS-REFERENCE TO RELATED APPLICATION

This is a continuation-in-part application of pending international application PCT/EP2009/054624 filed Apr. 17, 2009 and claiming the priority of German Application No. 10 2008 028 652.4 filed Jun. 18, 2008.

BACKGROUND OF THE INVENTION

The invention resides in a press with a press drive, for example, for the manufacture of metal sheet parts or for the deformation of massive metal components.

In the present state of the art, in the deformation of metal sheets for same time, mechanically driven presses with fly wheel drives have been used. In such presses, the travel-time curve of the plunger as generated by the kinematics of the drive which transmits the drive energy of the fly wheel to the plunger is predetermined. Changes in the travel-drive curve are only possible in connection with a stroke change. The striving for more productive manufacturing processes and the continually increasing requirements in the drawing processes resulted lately in the use of so-called servo presses in the shaping of sheet metal parts.

These servo presses are equipped with variable servo drives capable of generating different press forces. These presses are driven by one or several servomotors, which act directly on the drive train, without a fly wheel and without a clutch. In servo presses with relatively large press forces, high-moment torque motors are often used. With respect to speed and direction of rotation these motors can be controlled in a flexible manner so that they are programmable for different travel-time curves of the plunger. Curves from a sine-shaped course of an eccentric press, the curves of toggle joint lever drives or component design-specific curves may be established. The plunger can be independently positioned, it can be braked at any location or accelerated and it may even be operated in an oscillating back and forth movement by reversing the eccentric between two points.

Such a servo press is disclosed, for example, in DE 10 2004 009 256 B4. The press described herein includes several servomotors which jointly operate a plunger. The servomotors act on the plunger via a drive which has a mass moment of inertia. This mass moment of inertia may be increased by an additional fly wheel, if desired. However, altogether the resulting mass inertia moment is selected so as to be less than that of conventional presses in which the fly wheel stores sufficient energy to complete a working stroke. It is rather so small that the servomotors can accelerate the fly wheel from a stand still and again brake it to a stand still. With such a design, it is possible to operate the presses on one hand in a reversing operation with variable strokes wherein, on the other hand, high press forces can be obtained with the aid of the fly wheel.

It is, however, a disadvantage of this solution that in spite of drive simplifications, complicated and costly movement transmission means in the form of gears are still needed. DE 41 09 796 C2 discloses an arrangement for pressing, bending and punching of metal work pieces wherein a servomotor acts directly on an eccentric. With this arrangement the stroke length, as well as the press forces, are to be changed a simple manner. In addition, by an axial guiding of the plunger, it's surface of contact with the workpiece is to remain unchanged. A disadvantage of this solution however is surely a limitation to very small press forces. For large deformation presses with several pressure points, such an arrangement is not suitable.

Based on this state of the art, it is the object of the present invention to provide a press having a press drive which on one hand is capable to generate high press forces with a variable plunger movement and, on the other hand is of simple design and cost effective.

SUMMARY OF THE INVENTION

With reference to FIGS. 1A and 1B, the invention relates to a press having a press drive, without any motion transmitting means, such as, for example, gears or gear drives wherein a direct electric drive 35 is located between an eccentric 3 and a connecting rod 6 and brings about a relative movement between the eccentric 3 and the connecting rod 6.

The basic concept of the invention provides a press having a press drive with a direct electric drive without motion transmission means as, for example, gears or gear drives. This is achieved in that in a press drive having an eccentric is provided with a direct electric drive consisting of a rotor and a stator are used which act directly on the, one or several, connecting rods. The direct electric drive directly drives one eccentric or several eccentrics which are rotatably connected to the connecting rods. In principle, several variations of the press drive according to the invention are possible. In the preferred embodiment of the invention, the direct electric drive is disposed between an eccentric and a connecting rod rotatably supported on the eccentric. The eccentric is provided at its outer circumference with a number of permanent magnets corresponding to a desired press force. At the inner surface of the connecting rod eye facing the permanent magnets—coils are arranged. The operation of the direct electric drive of the press drive according to the invention corresponds essentially to the mode of operation of a permanent magnet synchronous motor. There is a difference in the mode of operation of the rotor and the stator in relation to the overall system. Which in a conventional permanent magnet synchronous motor the stator is stationary and the rotor rotates concentrically around the stator, in the direct electric drive according to the invention also the stator moves relative to the overall system of the press because of the eccentricity of the permanent magnet arrangement relative to the eccentric shaft. However, if the movement of the inner eye surface of the connecting rod relative to the outer surface of the eccentric is considered, the mode of operation corresponds to that of a rotor-stator structure of a permanent magnet synchronous motor.

The connecting rod is rotatably connected to the eccentric preferably via a friction bearing. In this way it is ensured, that between the permanent magnets which are arranged at the outer circumference of the eccentric and the windings which are arranged on the eye surface of the connecting rod, a gap of predetermined size is provided. Only two components of each press drive are connected with the surrounding structure. The eccentric shaft is rotatably supported at the head end. Common types of bearings known in the art may be used. The second connecting point is at the plunger. It is a design that is used in a conventional mechanical press. A bolt which is supported in the center of a connecting rod eye or bore, is rotatably supported at its outer end in the plunger or, respectively, in the pressure point of the plunger. In contrast to the conventional drives, the connecting point in the plunger serves the purposes for the press drive according to the invention, in addition to providing the motion on force transmission in the vertical direction, also, functions as a moment bearing. The drive moment is supported in the plunger bearing via plunger guide structures on the press frame. As a result, a separate moment support structure is not needed in connection with the press drive according to the invention.

Further advantages and particulars of the invention will become more readily apparent from the following description of advantageous embodiments with reference to the accompanying drawings.

DETAILED DESCRIPTION OF THE INVENTION

Figure 1A:
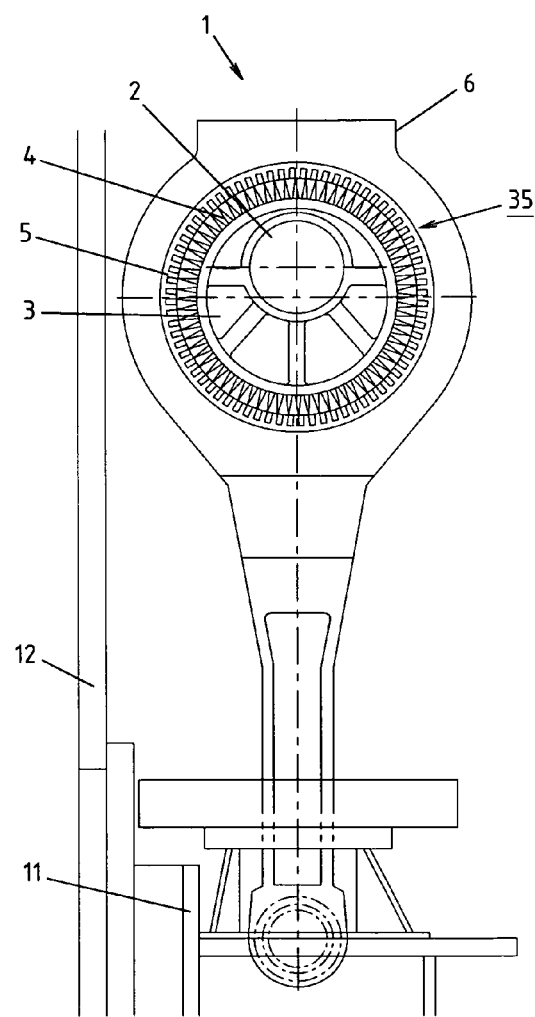
FIG. 1A is a side view of the press drive according to the invention.
Figure 1B:
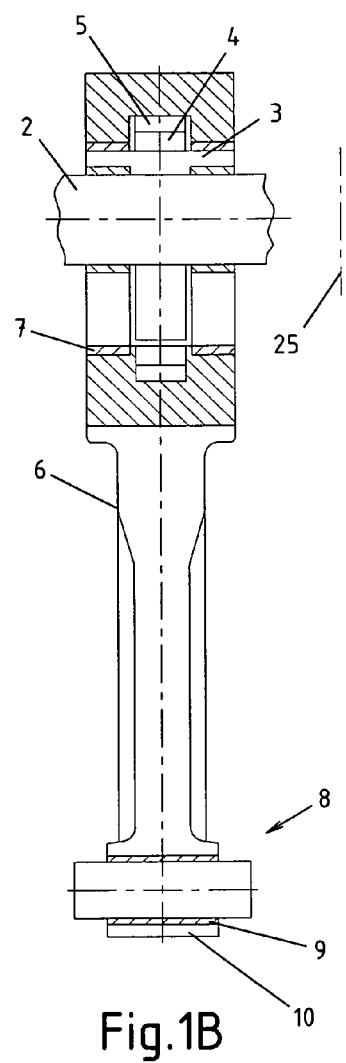
FIG. 1B shows the press drive in an axial cross-sectional view.

FIG. 1A shows a direct press drive 1 according to the invention in a side view and FIG. 1B shows it in an axial cross-sectional view. Shown in the FIGS. 1A and 1B is an eccentric shaft 2 which is rotatably supported in a frame head piece 25 which is not shown in detail in the drawings. The eccentric shaft 2 is provided with an eccentric 3 and rotates it about the axis of the eccentric shaft 2. At the outer circumference of the eccentric 3 numerous permanent magnets 4 are securely arranged. In a preferred embodiment the eccentric 3 consists of aluminum. The number of the permanent magnets 4 or, respectively, the poles together with the geometrical shape of components determines the size of the torque that can be generated and of the resulting press force. Opposite the permanent magnets 4 there are windings 5 which are mounted to the inner surface of the eye or opening of the connecting rod 6. Between the outer surface of the permanent magnets 4 and the opposite surface of the windings 5 there is an air gap of generally a few millimeters. When the windings 5 are energized, a circumferentially directed force is generated via the permanent magnets 4 which cause rotation of the inner surface of the connecting rod eye relative to the eccentric 3.

A detailed description of the direct electric drive 35 electromagnetic actions effective between the permanent magnets 4 and the winding 5 is not necessary here since they correspond exactly to the operational principle of permanent magnet synchronous motors which are well known in the art.

The connecting rod 6 and the eccentric 3 are interconnected rotatably by friction bearings 7 as shown in FIG. 1B. At the end of the connecting rod 6 remote from the drive, the connecting rod 6 is provided with a bore 8 in which a bolt 9 is supported by means of a friction bearing 10. This bolt 9 is rotatably connected at its outer ends to the plunger 11. The plunger 11 is guided by the support frame 12 via a linear guide structure (not shown) in such as way that it is movable in vertical direction. When now, the eccentric 3 is isolated by the direct electric drive relative to the connecting rod 6, the plunger 11 is moved vertically because the shaft 2 of the eccentric 3 is rotatably supported at its opposite ends on the frame head piece 25 and the bolt 9 is rotatably connected to the plunger 11.

Figure 2:
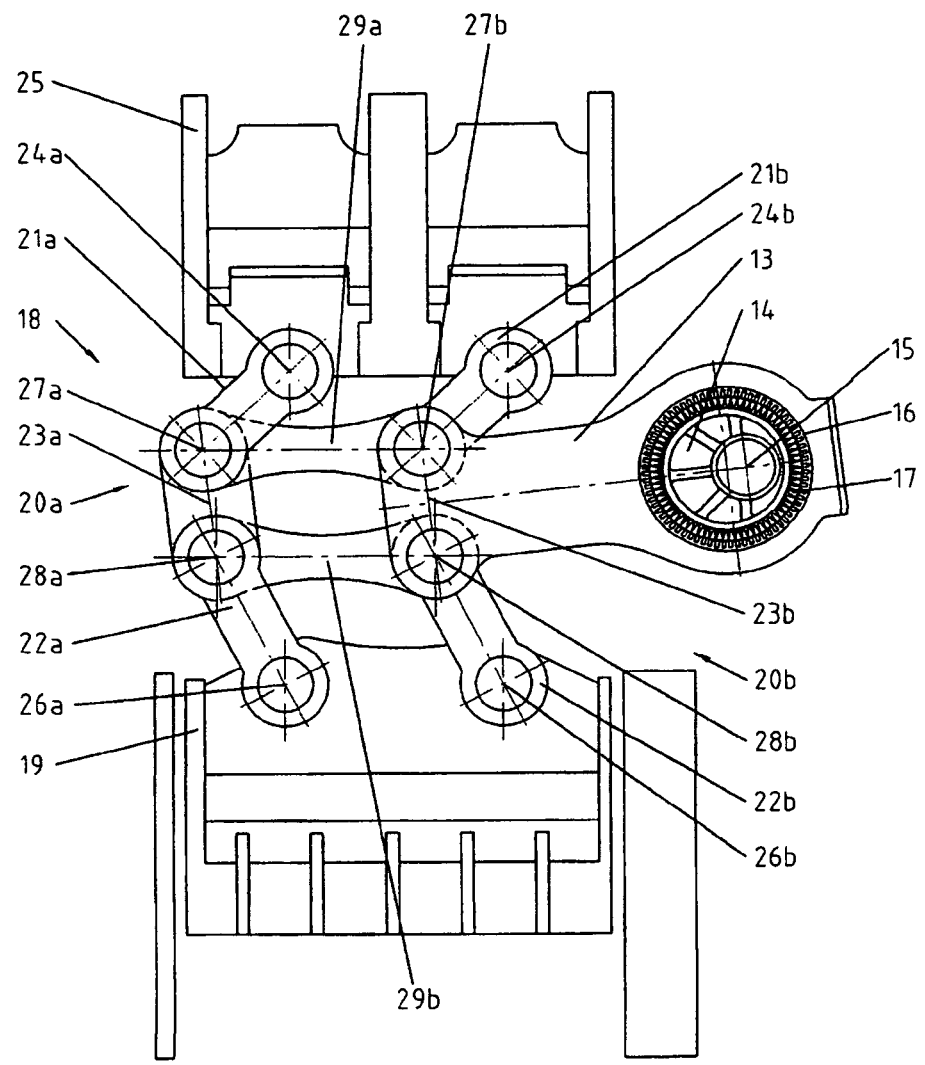
FIG. 2 shows the press drive according to the invention in connection with a double toggle lever joint; and, FIG. 3 shows two press drives according to the invention.

FIG. 2 shows another embodiment of the press drive 1 according to the invention. The drive arrangement for the connecting rod 13 corresponds to the drive arrangement as shown in FIG. 1. Between an eccentric 14 which is connected to a support shaft 15 and the connecting rod 13 the active elements of the direct electric drive, here the permanent magnets 16 and the windings 17, are disposed. The permanent magnets 16 are operatively securely arranged on the outer surface of the eccentric 14 proximate the windings 17 mounted at the inner surface of the connecting rod eye. It is noted however, that vice versa, the permanent magnets could be arranged on the connecting rod 13 and the windings 17 on the eccentric. In the exemplary embodiment shown in FIG. 2, an enhanced press drive 1 is provided wherein the driven connecting rod 13 is not directly connected to the plunger 19, but in this case, via a double toggle lever mechanism 18. The double toggle joint lever mechanism 18 comprises a left hand toggle lever mechanism 20a and a right hand toggle lever mechanism 20b. Each of the two toggle lever mechanisms 20a, 20b comprises an upper lever 21a, 21b and a lower lever 22a, 22b. The upper levers 21a and 21b are connected to the lower levers 22a, 22b via connecting structures 23a, 23b. The upper levers 21a, 21b are pivotally supported via the pivot joints 24a, 24b at the frame head piece 25. The lower levers 22a and 22b are connected to the plunger 19 at the pivot points 26a, 26b. The struts 29a and 29b are connected at their ends remote from the direct electric drive at the pivot points 27a, 28a to left hand (remote) toggle lever mechanism 20a and at the pivot points 27b, 28b to the right hand toggle mechanism 20b at the end of the connecting rod 13. When now the connecting rod 13 is moved by the driven eccentric 14; that movement is transmitted via the double toggle lever mechanism 18 to the plunger 19 in such a way that it performs a vertical up and down movement.

Figure 3:
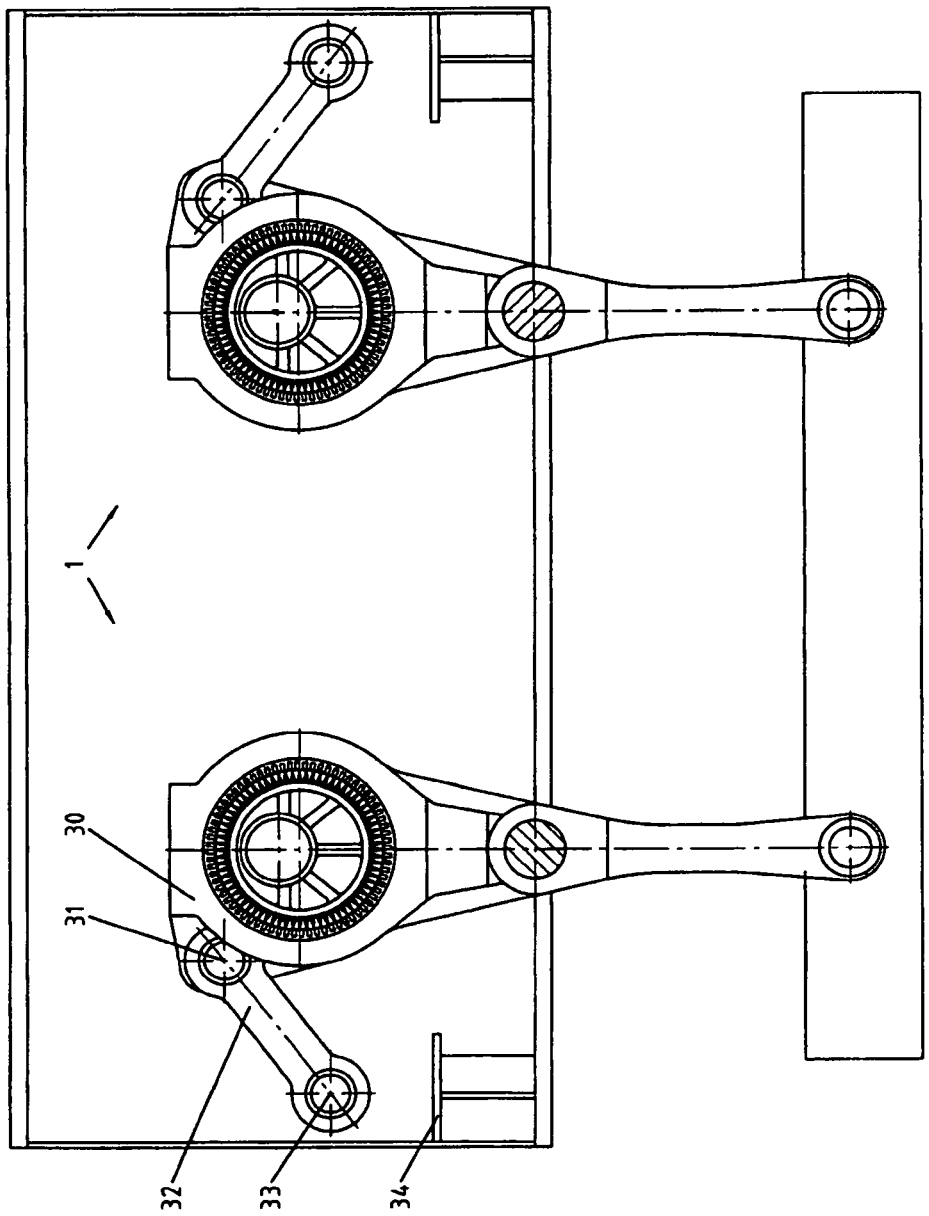

FIG. 3 shows another exemplary embodiment of press according to the invention. In addition to the drive arrangement already shown in FIG. 1 the two press drives 1 shown in FIG. 3 include connecting rods 30 which are linked to the frame head piece 34 by way of links 32 by means of pivot joints 31 and 33 providing for a kinematics with much increased pressure focus near the bottom dead center position of the plunger structure similar to a toggle lever drive. With this kinematics relatively small press drives can be used which provide for relatively large pressure forces where they are needed that is near the bottom dead center position of the press drive. The two press drives 1 have no mechanical synchronization, for example, in the form of intermediate gears. Synchronization is provided electronically by the control of the direct electric drive. With such an electronic control, also a tilt movement of the plunger can be obtained by a predetermined unsynchronous drive control. If such a tilt control is used, provisions must be made for the plunger guide structure that parallelity deviations of the plunger can be accommodated.

The press drive 1 of the present invention can be used in connection with single-joint or multi-joint drives. Preferably the connecting rods 6, 13 of the present invention consist of a fiber-reinforced material.

The invention is not limited to the described exemplary embodiment. It encompasses also all variations within the frame of the inventive concept.

REFERENCE NUMERALS 1 press drive
2 eccentric shaft
3 eccentric
4 permanent magnets
5 windings
6 connecting rod
7 friction bearing
8 bore
9 bolt
10 friction bearing 11 plunger
12 machine frame
13 connecting rod
14 eccentric
15 support shaft
16 permanent magnets
17 windings
18 double toggle lever joint mechanism
19 plunger
20a left hand toggle lever mechanism
20b right hand toggle lever mechanism
21a, b upper lever
22a, b lower lever
23a, b connecting structure
24a, b pivot joints
25 frame head piece
26a, b pivot points
27a, b pivot points
28a, b pivot points
29a, b struts
30 connecting rod
31 pivot joints
32 links
33 pivot joints
34 frame head piece
35 direct electric drive

What is claimed is:

1. A press for deformation of metal sheets or massive metal components comprising at least one press drive, each of the at least one press drive including an eccentric shaft carrying an eccentric and a connecting rod connected to the eccentric to be activated thereby, the axis of the eccentric shaft offset from the axis of the eccentric, the connecting rod having a first opening operatively surrounding the outer circumference of the eccentric, a direct electric drive including permanent magnets disposed on one of the outer circumference of the eccentric and the inner surface of the first opening of the connecting rod and windings disposed on the connecting rod or, respectively, the eccentric for generating a relative rotational movement between the eccentric and the surrounding connecting rod, the eccentric and surrounding connecting rod in operative relationship with the direct electric drive without mechanical motion transmission apparatus, for generating the relative rotational eccentric movement between the eccentric and the surrounding connecting rod for producing said deformation.

2. The press according to claim 1, wherein the direct electric drive is a permanent magnet synchronous motor.

3. The press according to claim 1, further including a double toggle lever joint mechanism in operative connection between the connecting rod and a plunger.

4. The press according to claim 1, wherein the connecting rod is rotatably connected with its end remote from the first opening thereof to a plunger via a friction bearing which also provides for reaction torque support of the press drive.

5. The press according to claim 1, wherein the eccentric shaft is rotatably supported on a frame head piece.

6. The press according to claim 1, wherein two press drives are operatively connected to a single plunger, each press drive includes a connecting rod operatively linked to a frame head piece via a link having a first pivot joint and a second pivot joint operatively positioned at opposite ends thereof, each connecting rod operatively connected to the single plunger.

7. The press according to claim 1, wherein the movement and force transfer of the connecting rod to a plunger occurs by means of a lever arrangement.

8. The press according to claim 7, wherein the movement and force transfer lever arrangement is a double toggle lever joint mechanism.

9. The press according to claim 4, wherein said single press drive is a single joint drive having the connecting rod directly connected to the plunger.

10. The press according to claim 1, wherein the connecting rod consists of a fiber-reinforced material.

11. The press according to claim 3, wherein said at least one press drive is a multi-joint drive having the connecting rod not directly connected to the plunger.

12. The press according to claim 3, where said double toggle lever mechanism comprises a left hand toggle lever mechanism and a right hand toggle lever mechanism, the left hand toggle lever mechanism and the right hand toggle lever mechanism each comprise an upper lever and a lower lever, the upper levers are each operatively connected via connecting structures, the upper levers are each pivotally supported via a pivot joint at a frame head piece, the lower levers are each operatively connected to plunger at a first pivot point, a strut is connected at an end thereof remote from the direct electric drive to a second pivot point to the left hand toggle mechanism and the strut is connected at an end of the connecting rod at a third pivot point to the right hand toggle mechanism.

* * * * *